US011199426B2

(12) United States Patent
Weber

(10) Patent No.: US 11,199,426 B2
(45) Date of Patent: Dec. 14, 2021

(54) SYSTEMS AND METHODS FOR CRANKSHAFT TOOTH ENCODING

(71) Applicant: Honda Motor Co., Ltd., Tokyo (JP)

(72) Inventor: Philip R. Weber, Dublin, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 317 days.

(21) Appl. No.: 16/271,087

(22) Filed: Feb. 8, 2019

(65) Prior Publication Data

US 2020/0256706 A1    Aug. 13, 2020

(51) Int. Cl.
*G01D 5/24* (2006.01)
*G01D 5/249* (2006.01)
*F02D 41/00* (2006.01)

(52) U.S. Cl.
CPC ............ *G01D 5/249* (2013.01); *F02D 41/009* (2013.01)

(58) Field of Classification Search
CPC ...... G01D 5/249; G01D 5/2451; G01D 5/145; F02D 41/009
See application file for complete search history.

(56) References Cited

U.S. PATENT DOCUMENTS

| | | |
|---|---|---|
| 3,979,161 A | 9/1976 | Kremer et al. |
| 4,116,175 A | 9/1978 | Sand |
| 4,121,112 A | 10/1978 | Hartig |
| 4,138,976 A | 2/1979 | Crall |
| 4,518,918 A | 5/1985 | Avery |
| 4,528,471 A | 7/1985 | Baumann |
| 4,535,289 A | 8/1985 | Abe et al. |
| 4,827,800 A | 5/1989 | Pedersen et al. |
| 4,935,698 A | 6/1990 | Kawaji et al. |
| 5,070,727 A | 12/1991 | David et al. |
| 5,084,674 A | 1/1992 | Lachmann et al. |

(Continued)

FOREIGN PATENT DOCUMENTS

| | | |
|---|---|---|
| CN | 203223516 U | 10/2013 |
| CN | 203780034 U | 8/2014 |

(Continued)

OTHER PUBLICATIONS

"2011-17 Mustang Ford Performance High RPM Competition Ignition Pulse Ring 5.0." Late Model Restoration. (Accessed Jun. 16, 2020.).

(Continued)

*Primary Examiner* — Joseph J Dallo
(74) *Attorney, Agent, or Firm* — Rankin, Hill & Clark LLP

(57) ABSTRACT

Embodiments, systems, and methods for crankshaft tooth encoding for a crank pulse wheel of a vehicle are provided. In some embodiments, a system for crankshaft tooth encoding includes a read module, a buffer module, and a position module. The read module identifies a tooth type for N number of teeth in a sliding buffer based on at least one tooth characteristic. N is a positive integer less than a total number of teeth of the crank pulse wheel. The buffer module calculates a buffer value for the sliding buffer corresponding to a tooth represented in the sliding buffer. The position module determines an angular position of the crank pulse wheel based on the buffer value. The position module broadcasts the angular position to one or more vehicle systems of the vehicle.

17 Claims, 11 Drawing Sheets

(56) References Cited

U.S. PATENT DOCUMENTS

| | | | |
|---|---|---|---|
| 5,182,943 A | 2/1993 | Fukui et al. | |
| 5,444,370 A | 8/1995 | Wu | |
| 5,623,412 A * | 4/1997 | Masson | F02B 77/087 |
| | | | 123/406.34 |
| 5,694,040 A | 12/1997 | Plagens | |
| 5,794,171 A | 8/1998 | Bryant et al. | |
| 5,856,922 A | 1/1999 | Jehanno | |
| 5,870,688 A | 2/1999 | Kanbara et al. | |
| 6,012,551 A | 1/2000 | Raab | |
| 6,062,071 A | 5/2000 | Henn et al. | |
| 6,175,233 B1 | 1/2001 | McCurley et al. | |
| 6,199,426 B1 | 3/2001 | Shibagaki | |
| 6,341,253 B1 * | 1/2002 | Honda | F02D 41/009 |
| | | | 123/406.62 |
| 6,346,808 B1 * | 2/2002 | Schroeder | G01D 5/145 |
| | | | 324/207.21 |
| 6,404,188 B1 | 6/2002 | Ricks | |
| 6,474,278 B1 | 11/2002 | Davis et al. | |
| 6,490,914 B1 | 12/2002 | Brandenburg et al. | |
| 6,566,867 B1 * | 5/2003 | Schroeder | F02D 41/009 |
| | | | 324/207.22 |
| 6,609,498 B2 | 8/2003 | Mathews et al. | |
| 6,737,861 B2 | 5/2004 | Lantto | |
| 6,752,009 B2 | 6/2004 | Minich et al. | |
| 6,978,666 B1 | 12/2005 | Wu et al. | |
| 7,069,774 B2 | 7/2006 | Nakamura et al. | |
| 7,096,593 B2 | 8/2006 | Schmied | |
| 7,116,096 B2 | 10/2006 | Waszkowski et al. | |
| 7,135,856 B2 | 11/2006 | Eidenvall et al. | |
| 7,167,793 B1 | 1/2007 | Gibson et al. | |
| 7,458,164 B2 | 12/2008 | Perret et al. | |
| 7,942,041 B2 | 5/2011 | Takeuchi | |
| 8,085,036 B2 | 12/2011 | Ausserlechner | |
| 8,120,351 B2 | 2/2012 | Rettig et al. | |
| 8,978,453 B2 | 3/2015 | Fayyad et al. | |
| 9,297,321 B2 | 3/2016 | Hawken et al. | |
| 9,297,346 B2 | 3/2016 | Wang | |
| 9,303,972 B2 | 4/2016 | Oberhauser et al. | |
| 9,465,087 B2 | 10/2016 | Klotzbuecher et al. | |
| 9,568,310 B2 | 2/2017 | Stuckert et al. | |
| 9,765,711 B2 | 9/2017 | Martinson | |
| 9,938,921 B2 | 4/2018 | Hagari et al. | |
| 10,036,653 B2 | 7/2018 | Hernandez-Oliver | |
| 10,184,860 B2 | 1/2019 | Schweikert et al. | |
| 10,234,513 B2 | 3/2019 | Vig et al. | |
| 10,254,103 B2 | 4/2019 | Taylor et al. | |
| 10,260,906 B2 | 4/2019 | Liu et al. | |
| 10,428,752 B2 | 10/2019 | Mazenc et al. | |
| 2002/0093202 A1 * | 7/2002 | Downs | B60W 10/06 |
| | | | 290/40 R |
| 2003/0168044 A1 | 9/2003 | Rupp et al. | |
| 2004/0020472 A1 * | 2/2004 | Bayerle | F02D 41/047 |
| | | | 123/491 |
| 2005/0061293 A1 * | 3/2005 | Chung | B60K 6/445 |
| | | | 123/198 DB |
| 2005/0285592 A1 | 12/2005 | Taniguchi et al. | |
| 2006/0089784 A1 * | 4/2006 | Spicer | F02D 41/009 |
| | | | 701/115 |
| 2006/0150938 A1 | 7/2006 | Kramer | |
| 2007/0068015 A1 * | 3/2007 | Perret | G01P 3/481 |
| | | | 33/1 PT |
| 2007/0170913 A1 | 7/2007 | Yokotani et al. | |
| 2008/0022760 A1 * | 1/2008 | McDaniel | F02D 41/042 |
| | | | 73/114.77 |
| 2008/0027622 A1 * | 1/2008 | McDaniel | F02D 41/009 |
| | | | 701/102 |
| 2008/0125929 A1 * | 5/2008 | Prokhorov | F02D 41/009 |
| | | | 701/31.4 |
| 2008/0173079 A1 * | 7/2008 | McGee | F02D 41/009 |
| | | | 73/114.26 |
| 2009/0276143 A1 | 11/2009 | Rackmil et al. | |
| 2009/0301179 A1 * | 12/2009 | Moessner | F02D 41/009 |
| | | | 73/114.26 |
| 2010/0072988 A1 * | 3/2010 | Hammerschmidt | G01R 33/093 |
| | | | 324/207.25 |
| 2010/0107747 A1 * | 5/2010 | Rolew | G01P 13/045 |
| | | | 73/114.26 |
| 2011/0048350 A1 | 3/2011 | Simpson et al. | |
| 2011/0213545 A1 * | 9/2011 | Oaten | F02D 41/009 |
| | | | 701/103 |
| 2012/0271536 A1 | 10/2012 | Hamedovic et al. | |
| 2013/0073182 A1 | 3/2013 | Lindsay et al. | |
| 2013/0082693 A1 * | 4/2013 | Boehl | G01B 7/30 |
| | | | 324/207.25 |
| 2013/0096872 A1 * | 4/2013 | Boehl | G06F 17/18 |
| | | | 702/151 |
| 2013/0151194 A1 * | 6/2013 | Hawken | F02D 41/222 |
| | | | 702/151 |
| 2013/0180505 A1 * | 7/2013 | Schule | F02D 13/0207 |
| | | | 123/445 |
| 2014/0019084 A1 | 1/2014 | Rolew et al. | |
| 2014/0060486 A1 * | 3/2014 | Maezawa | F02D 41/009 |
| | | | 123/350 |
| 2014/0084906 A1 | 3/2014 | Ruigrok et al. | |
| 2014/0107904 A1 * | 4/2014 | Nefzer | F02D 41/009 |
| | | | 701/101 |
| 2014/0232379 A1 | 8/2014 | Nazarian et al. | |
| 2015/0354479 A1 | 12/2015 | Lindsay et al. | |
| 2015/0369195 A1 * | 12/2015 | Wang | F02D 13/0219 |
| | | | 701/113 |
| 2017/0102291 A1 * | 4/2017 | Gladel | F02D 41/1497 |
| 2017/0138281 A1 * | 5/2017 | Utley | H02K 11/21 |
| 2017/0217427 A1 * | 8/2017 | Wei | B60W 20/50 |
| 2017/0276740 A1 * | 9/2017 | Schmitt | G01R 33/091 |
| 2017/0292898 A1 * | 10/2017 | Schweikert | F02D 41/009 |
| 2017/0299467 A1 | 10/2017 | Johansson et al. | |
| 2017/0363512 A1 | 12/2017 | Ognibene | |
| 2018/0195453 A1 * | 7/2018 | Zhang | B60W 10/06 |
| 2018/0230865 A1 | 8/2018 | Brown | |
| 2018/0298836 A1 | 10/2018 | Stowasser et al. | |
| 2018/0355815 A1 * | 12/2018 | Braun | F02D 41/0002 |
| 2019/0086236 A1 | 3/2019 | Binder et al. | |
| 2019/0301897 A1 | 10/2019 | Kisaichi et al. | |
| 2020/0064156 A1 | 2/2020 | Hirano et al. | |

FOREIGN PATENT DOCUMENTS

| | | |
|---|---|---|
| CN | 206556614 U | 10/2017 |
| DE | 102010041444 | 3/2012 |
| EP | 0071885 | 2/1983 |
| EP | 1544622 | 6/2005 |
| FR | 2843614 A1 | 2/2004 |
| FR | 2894665 | 6/2007 |
| GB | 2343955 | 5/2000 |
| JP | H09231889 | 9/1997 |
| JP | 2004060450 A | 2/2004 |
| JP | 5724337 B2 | 5/2015 |
| WO | WO2018042911 | 3/2018 |

OTHER PUBLICATIONS

"BMW S14 140mm Race with Integral 60-2 Trigger." TTV Racing. (Accessed Jun. 16, 2020.).

"Tone Ring." Rick's Free Auto Repair Advice. (Accessed Jun. 16, 2020.).

Mavrigian, Mike "Installation and Removal Tips for LS Engine 24x or 58x Reluctor Wheels." On All Cylinders. Apr. 19, 2018. (Accessed Jun. 16, 2020.).

Notice of Allowance of U.S. Appl. No. 16/657,134 dated Jun. 3, 2021, 29 pages.

Notice of Allowance of U.S. Appl. No. 16/987,889 dated Jul. 8, 2021, 31 pages.

Notice of Allowance of U.S. Appl. No. 17/062,277 dated Jul. 23, 2021, 30 pages.

* cited by examiner

FIG. 5

| Tooth Number | 414 | 416 | 418 | 420 | 422 | 424 | 426 | 428 | 430 | 432 | 434 | 436 |
|---|---|---|---|---|---|---|---|---|---|---|---|---|
| Characteristic Value | 1 | 3 | 3 | 2 | 1 | 2 | 3 | 2 | 2 | 3 | 3 | 1 |

502 highlights columns 414 and 420.

FIG. 6

| Tooth Number | 414 | 416 | 418 | 420 | 422 | 424 | 426 | 428 | 430 | 432 | 434 | 436 |
|---|---|---|---|---|---|---|---|---|---|---|---|---|
| Characteristic Value | 1 | 3 | 3 | 2 | 1 | 2 | 3 | 2 | 2 | 3 | 3 | 1 |

602 highlights columns 416 through 422.

FIG. 7

| Tooth Number | 414 | 416 | 418 | 420 | 422 | 424 | 426 | 428 | 430 | 432 | 434 | 436 |
|---|---|---|---|---|---|---|---|---|---|---|---|---|
| Characteristic Value | 1 | 3 | 3 | 2 | 1 | 2 | 3 | 2 | 2 | 3 | 3 | 1 |

702 highlights columns 418 through 422.

| 414 | 416 | 418 | 420 | 422 | 424 | 426 | 428 | 430 | 432 | 434 | 436 |
|---|---|---|---|---|---|---|---|---|---|---|---|
| (3,1,1) | (1,1,3) | (1,3,3) | (3,3,2) | (3,2,1) | (2,1,2) | (1,2,3) | (2,3,1) | (3,1,2) | (2,2,3) | (2,3,3) | (3,3,1) |
| 270° | 300° | 330° | 0° | 30° | 60° | 90° | 120° | 150° | 180° | 210° | 240° |

| 904 Characteristic Value | 0 | 0 | 0 | 0 | 1 | 1 | 1 | 1 | 1 | 1 | 0 | 1 | 1 | 0 | 0 | 1 | 1 | 0 | 1 | 1 | 0 | 0 | 0 | 1 | 0 | 1 | 0 | 0 | 1 | 0 | 0 | 1 |
|---|---|---|---|---|---|---|---|---|---|---|---|---|---|---|---|---|---|---|---|---|---|---|---|---|---|---|---|---|---|---|---|---|
| 906 Tooth Number | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 908 Buffer Value | 18 | 4 | 8 | 16 | 0 | 1 | 3 | 7 | 15 | 31 | 30 | 29 | 27 | 23 | 14 | 28 | 25 | 19 | 6 | 13 | 26 | 21 | 11 | 22 | 12 | 24 | 17 | 2 | 5 | 10 | 20 | 9 |

Positions 920, 912, 910 are indicated at buffer value entries {18, 4, 8} / {0, 1, 3} / {1, 3, 7} region.

| 916 Calibration Value | 4 | 5 | 27 | 6 | 1 | 28 | 18 | 7 | 2 | 31 | 9 | 10 | 24 | 19 | 14 | 8 | 3 | 26 | 0 | 17 | 30 | 21 | 22 | 23 | 24 | 25 | 20 | 16 | 12 | 15 | 11 | 10 | 9 |
|---|---|---|---|---|---|---|---|---|---|---|---|---|---|---|---|---|---|---|---|---|---|---|---|---|---|---|---|---|---|---|---|---|---|
| 918 Buffer Value Index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | |

FIG. 9

SYSTEMS AND METHODS FOR CRANKSHAFT TOOTH ENCODING

BACKGROUND

A crankshaft sensor is used to determine the position and timing of an engine of a vehicle. In particular, as a crank pulse wheel of the crankshaft turns, the crankshaft sensor detects tooth pulses corresponding to the teeth of the crank pulse wheel. The tooth pulses correspond to angular positions of the crankshaft so that the appropriate engine timing can be determined based on the position of the crank pulse wheel in combination with camshaft position information. For example, the crank pulse wheel has at least one missing or altered tooth that allows the position of the crank pulse wheel to be indexed/determined. However, using missing or altered tooth alone may require prior knowledge of the position of the crankshaft pulse wheel or the crankshaft pulse wheel must rotate past the missing or altered teeth before the crankshaft position can be determined. For example, the crank pulse wheel of the crankshaft may have to rotate 360 degrees before being able to associate a tooth pulse with a particular angular position. Accordingly, determining the position and timing of the engine may require additional time or information.

BRIEF DESCRIPTION

According to one or more aspects, a system for crankshaft tooth encoding of a crank pulse wheel of a vehicle is provided. In one embodiment, the system includes a read module, a buffer module, and a position module. The read module identifies a tooth type for N number of teeth in a sliding buffer based on at least one tooth characteristic. N is a positive integer less than a total number of teeth on the crank pulse wheel. The buffer module calculates a buffer value for the sliding buffer corresponding to a tooth represented in the sliding buffer. The position module determines an angular position of the crank pulse wheel based on the buffer value. The position module also broadcasts the angular position to one or more vehicle systems of the vehicle.

According to one or more aspects, a method for crankshaft tooth encoding for a crank pulse wheel of a vehicle is provided. The method includes identifying a tooth type for N number of teeth in a sliding buffer based on at least one tooth characteristic. N is a positive integer less than a total number of teeth on the crank pulse wheel. The method also includes calculating a buffer value for the sliding buffer corresponding to a tooth represented in the sliding buffer. The method further includes determining an angular position of the crank pulse wheel based on the buffer value and broadcasting the angular position to one or more vehicle systems of the vehicle.

According to one or more aspects, a non-transitory computer-readable storage medium is provided for storing instructions that, when executed by a computer, cause the computer to perform a method for crankshaft tooth encoding for a crank pulse wheel of a vehicle. The method includes identifying a tooth type for N number of teeth in a sliding buffer based on at least one tooth characteristic. N is a positive integer less than a total number of teeth on the crank pulse wheel. The method also includes calculating a buffer value for the sliding buffer corresponding to a tooth represented in the sliding buffer. The method further includes determining an angular position of the crank pulse wheel based on the buffer value. The angular position is then broadcast to one or more vehicle systems of the vehicle.

BRIEF DESCRIPTION OF THE DRAWINGS

FIG. 5 is a crank tooth table with a first sliding buffer according to one or more embodiments.

FIG. 6 is a crank tooth table with a second sliding buffer according to one or more embodiments.

FIG. 7 is a crank tooth table with a third sliding buffer according to one or more embodiments.

FIG. 8 is a crank tooth map corresponding to FIGS. 4-7 according to one or more embodiments.

FIG. 9 is another crank tooth map corresponding to an example crank pulse wheel according to one or more embodiments.

DETAILED DESCRIPTION

Figure 1:
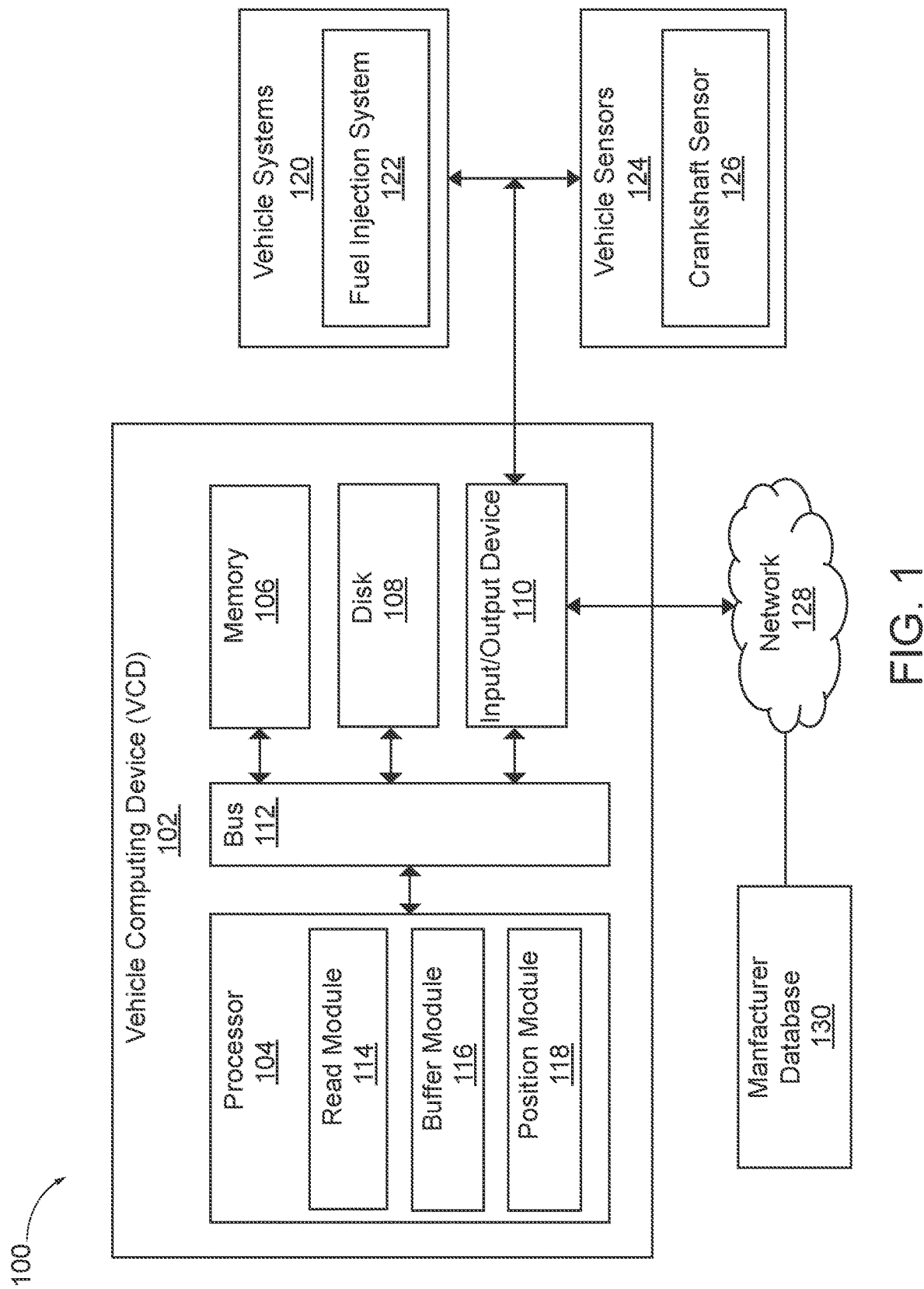
FIG. 1 is a schematic diagram of an operating environment for implementing systems and methods for crankshaft tooth encoding according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Definitions

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a mobile programmable agent bus that interconnects components inside a mobile programmable agent using protocols such as Media Oriented Systems Transport (MOST), Controller Area network (CAN), Local Interconnect Network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more computing devices (e.g., computer, personal digital assistant, cellular telephone, network device, mobile programmable agent, computing device, infrastructure device, security device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicle-to-everything (V2X) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

A "database," as used herein can refer to table, a set of tables, a set of data stores and/or methods for accessing and/or manipulating those data stores. Some databases can be incorporated with a disk as defined below.

A "disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor" as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with predetermined paths or free-moving vehicles.

"Vehicle control system" and/or "vehicle system," as used herein can include, but is not limited to, any automatic or manual systems that can be used to enhance the vehicle, driving, and/or safety. Exemplary vehicle systems include, but are not limited to: an engine control system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), an electronic pretensioning system, a monitoring system, a vehicle suspension system, a sensory system, an interior or exterior camera system among others.

I. System Overview

Figure 2:
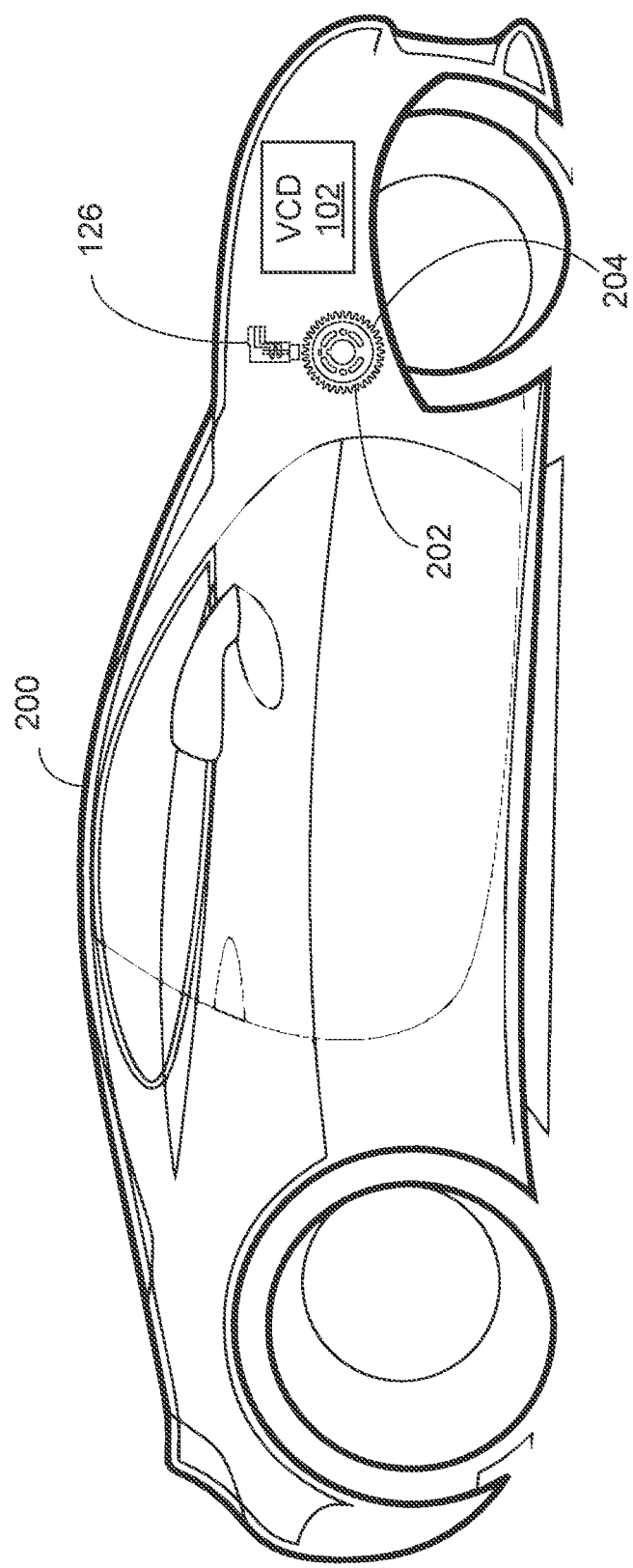
FIG. 2 is a schematic diagram of a crank pulse wheel and a crankshaft sensor according to one or more embodiments.

Referring now to the drawings, wherein the showings are for purposes of illustrating one or more exemplary embodiments and not for purposes of limiting same. FIG. 1 is a schematic diagram of an operating environment 100 for crankshaft tooth encoding. The components of operating environment 100, as well as the components of other systems, hardware architectures, and software architectures discussed herein, can be combined, omitted, or organized into different architectures for various embodiments. Further, the components of the operating environment 100 can be implemented with or associated with a vehicle 200 and a crank pulse wheel 202, as shown in FIG. 2.

In the illustrated embodiment of FIG. 1, the operating environment 100 includes a vehicle computing device (VCD) 102 with provisions for processing, communicating and interacting with various components of a vehicle, such as vehicle 200, and other components of the operating environment 100. In one embodiment, the VCD 102 can be implemented in the vehicle 200, for example, as part of a telematics unit, a head unit, a navigation unit, an infotainment unit, an electronic control unit, among others. In other embodiments, the components and functions of the VCD 102 can be implemented remotely from the vehicle 200, for example, with a portable device (not shown) or another device connected via a network (e.g., a network 128).

Generally, the VCD 102 includes a processor 104, a memory 106, a disk 108, and an input/output (I/O) interface 110, which are each operably connected for computer communication via a bus 112 and/or other wired and wireless technologies. The I/O interface 110 provides software and hardware to facilitate data input and output between the components of the VCD 102 and other components, networks, and data sources, which will be described herein. Additionally, the processor 104 includes a read module 114, a buffer module 116, and a position module 118 for crankshaft tooth encoding, facilitated by the components of the operating environment 100.

The VCD 102 is also operably connected for computer communication (e.g., via the bus 112 and/or the I/O interface 110) to one or more vehicle systems 120. The vehicle systems 120 can include, but are not limited to, any automatic or manual systems that can be used to enhance the vehicle 200, driving, and/or safety. Here, as an example, the vehicle systems 120 include a fuel injection system 122. The fuel injection system 122 delivers fuel to a combustion engine of the vehicle 200 based on synchronized timing to propel the vehicle 200.

The vehicle systems 120 include and/or are operably connected for computer communication to various vehicle sensors 124. The vehicle sensors 124 provide and/or sense information associated with the vehicle 200, the vehicle environment, and/or the vehicle systems 120. Here, the vehicle sensors 124 include a crankshaft sensor 126 for detecting the teeth on a crank pulse wheel 202. In some embodiments, the crankshaft sensor is a Hall Effect sensor with a digital output or a variable reluctance sensor having an analog output. In particular, the crankshaft sensor may measure the magnetic flux corresponding to the teeth on the crank pulse wheel. The crank pulse wheel 202 has a total number of teeth that extend outward from the main body of the crank pulse wheel 202. A tooth of the total number of teeth may have a profile that is polyhydric, conical, spherical, helical, beveled, crowned, cantilevered, angled, rounded, and/or irregular shaped, among others.

The vehicle sensors 124 can include, but are not limited to, image sensors, such as cameras, optical sensors, radio sensors, electromagnetic sensors, etc. mounted to the interior or exterior of the vehicle 200. The vehicle sensors 124 may detect characteristics of the engine, such as the position, timing, velocity, etc. of the components. Accordingly, the vehicle sensors 124 are operable to sense a measurement of data associated with the vehicle 200, the vehicle environment, and/or the vehicle systems 120, and generate a data signal indicating said measurement of data. These data signals can be converted into other data formats (e.g., numerical) and/or used by the vehicle systems 120 and/or the VCD 102 to generate other data metrics and parameters. For example, the data signals may convert the sensor data to values that can be used by the VCD 102. It is understood that the sensors can be any type of sensor, for example, acoustic, electric, magnetic, radio, environmental, optical, imaging, light, pressure, force, thermal, temperature, proximity, among others.

The VCD 102 is also operatively connected for computer communication to the network 128. It is understood that the connection from the I/O interface 110 and to the network 128 can be facilitated in various ways. For example, through a network connection (e.g., wired or wireless), a cellular data network from a portable device (not shown), a vehicle to vehicle ad-hoc network (not shown), an in-vehicle network (not shown), among others, or any combination of thereof. The network 128 is, for example, a data network, the Internet, a wide area network or a local area network. The network 128 serves as a communication medium to various remote devices (e.g., databases, web servers, remote servers, application servers, intermediary servers, client machines, other portable devices). For example, the VCD 102 may receive updates from a manufacturer database 130 using the network 128.

The application of systems for and methods for crankshaft tooth encoding are described with respect to the vehicle 200. As shown in FIG. 2, the vehicle 200 includes the operating environment 100, the crank pulse wheel 202, and the crankshaft sensor 126 described above. The crank pulse wheel 202 has teeth, such as tooth 204, having a predetermined geometry defined by at least on tooth characteristic. However, the crank pulse wheel 202 is exemplary in nature and may have more or fewer teeth with different profiles, geometries, and/or configurations on the crank pulse wheel 202.

Using the system and network configuration discussed above, the crankshaft teeth can be encoded to indicate a specific angular position on the crank pulse wheel 202 which can be used to determine the position and timing of the engine of the vehicle 200. In particular, the teeth have different geometries and are ordered such that when the VCD 102 reads a certain fixed number of consecutive teeth, the angular position of the crank pulse wheel 202 can be determined. The order of the teeth on the crank pulse wheel 202 is patterned such that the angular position of the crank pulse wheel 202 can be determined regardless of where on the crank pulse wheel 202 the reading began. Detailed embodiments describing exemplary methods using the system and network configuration discussed above will now be discussed in detail.

Application of Systems and Methods

Figure 3:
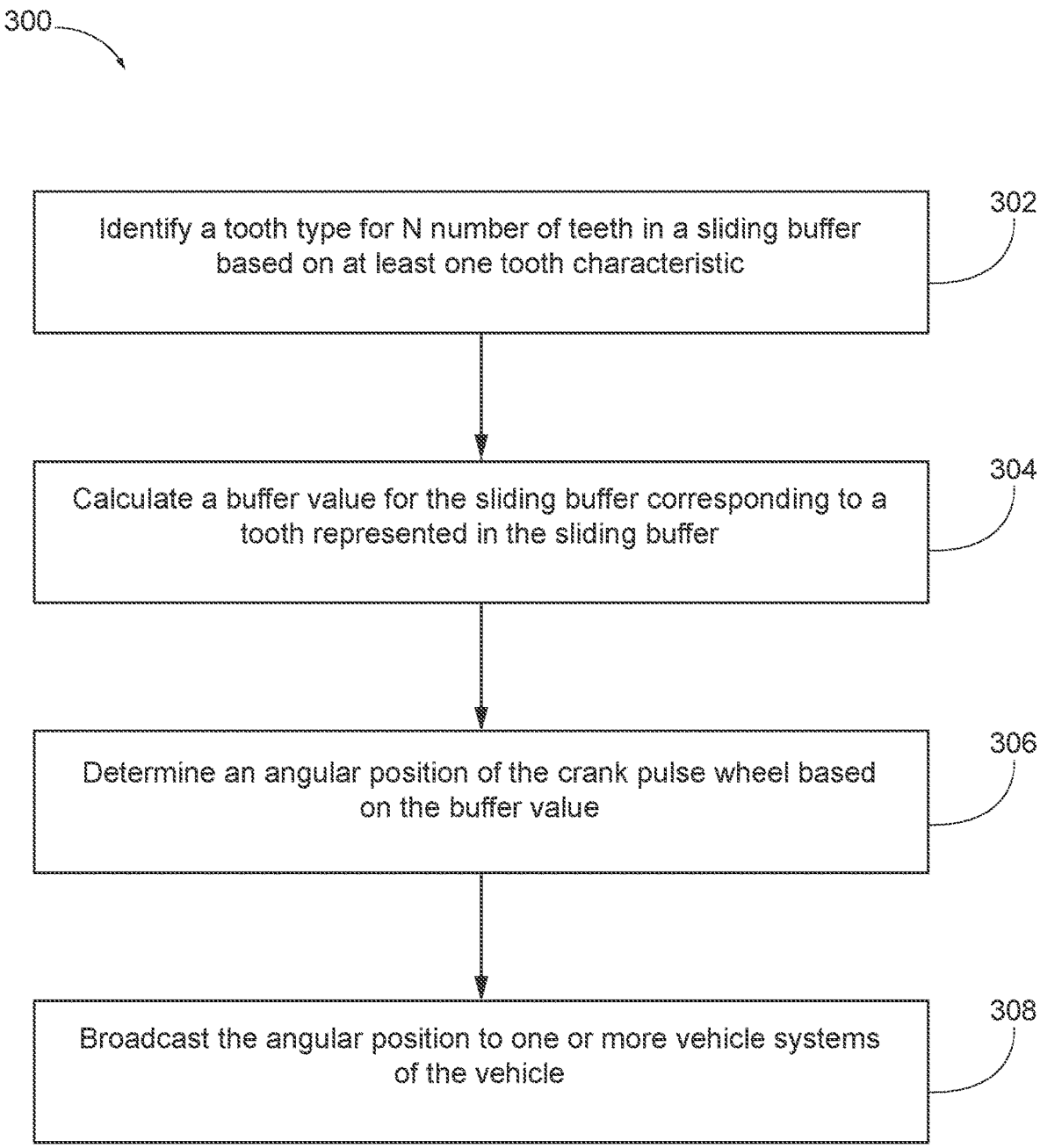
FIG. 3 is an example flow diagram of a method for crankshaft tooth encoding according to one or more embodiments.

Referring now to FIG. 3, a method 300 for crankshaft tooth encoding will now be described according to an exemplary embodiment. FIG. 3 will be described with reference to FIGS. 1, 2, and 4-9. As shown in FIG. 3, the method for providing a crankshaft tooth encoding is described according to a number steps for simplicity, but it is understood that the elements of the method 300 can be organized into different architectures, blocks, stages, and/or processes.

At block 302, a tooth type for N number of teeth of the crank pulse wheel 202 are identified based on at least one tooth characteristic. The identification processes described below are performed by, coordinated by, and/or facilitated by the read module 114. The at least one tooth characteristic is a physical geometric feature of at least some of the teeth on the crank pulse wheel 202 that make the teeth differentiable by the crankshaft sensor 126. The tooth geometry may include the size and/or shape of the teeth on the crank pulse wheel 202 or physical geometric features of the crank pulse wheel 202 itself. For example, the tooth geometry may include height, irregular formations (e.g., outcroppings, protrusions, nodules, etc.), thickness, depth, surface angle, surface patterning, voids, holes, cavities, and/or guides, among others. The tooth characteristics may also include material-based differences, differences in radiation profiles of the teeth, spectral differences on the electromagnetic spectrum, and/or optical differences, among others that can be sensed by the vehicle sensors 124.

Figure 4:
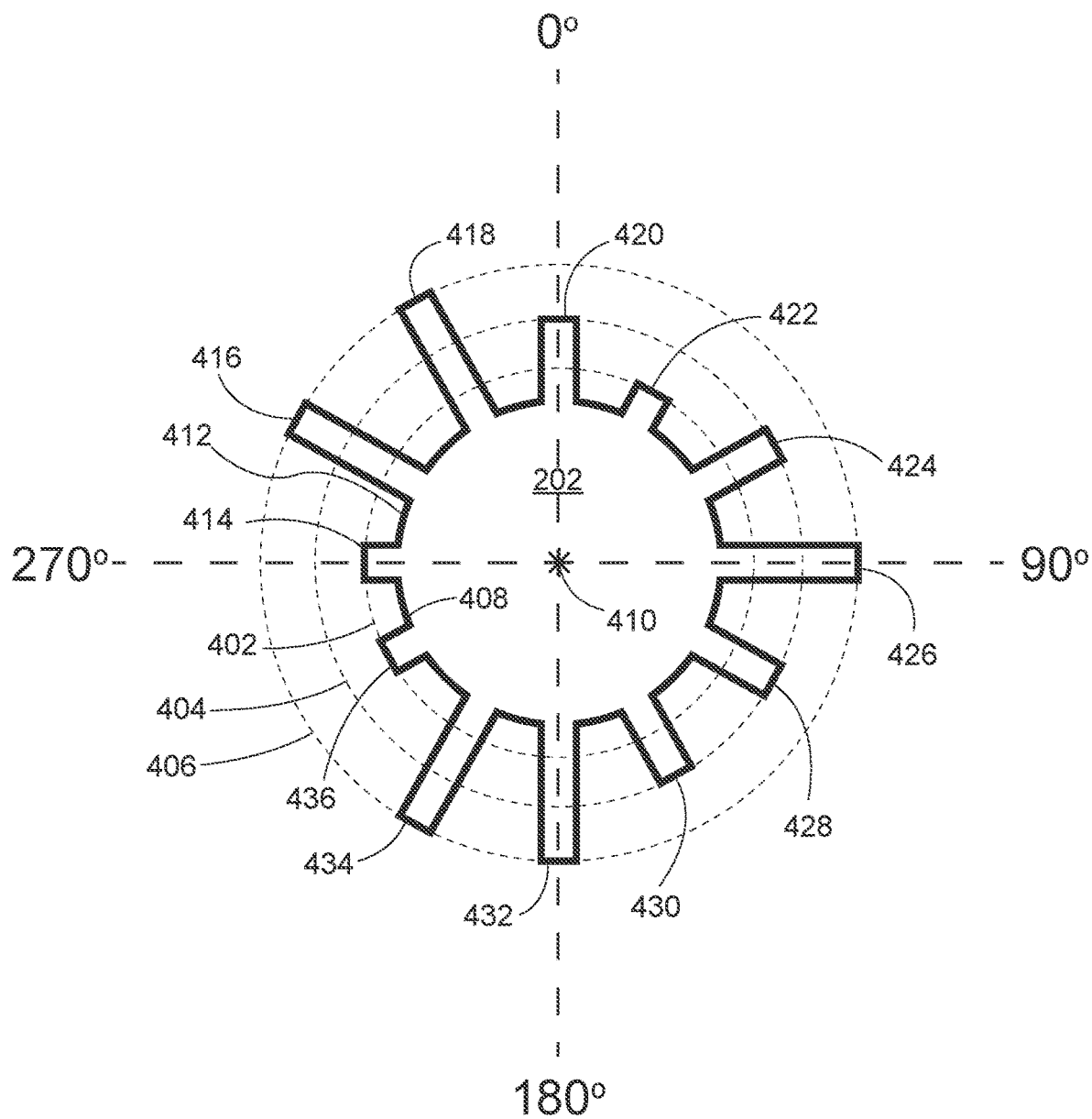
FIG. 4 is a schematic diagram of crankshaft tooth geometry of a crank pulse wheel according to one or more embodiments.

Turning to FIG. 4, suppose the at least one tooth characteristic is a height of the teeth of the crank pulse wheel 202. The read module 114 may register the height differential between the teeth by accessing the crankshaft sensor 126. The height may include a first height 402, a second height 404, and a third height 406 measured from a baseline 408. The radial distance between the baseline 408 and the center point 410 of the crank pulse wheel 202 forms the main body of the crank pulse wheel 202. Gaps are formed between the teeth, such as a gap 412 between the first tooth 414 and the second tooth 416.

The difference in the heights allows the crankshaft sensor 126 to differentiate between the teeth of the crank pulse wheel 202. In one embodiment, the read module 114 may receive the height differential as a characteristic value. For example, the characteristic value for the first height 402 is (1), the characteristic value for the second height 404 is (2), and the characteristic value for the third height 406 is (3). Accordingly, the first tooth 414 extends to the first height 402 (1), the second tooth 416 extends to the third height 406 (3), a third tooth 418 extends to the third height 406 (3), a fourth tooth 420 extends to the second height 404 (2), a fifth tooth 422 extends to the first height 402 (1), a sixth tooth 424 extends to the second height 404 (2), a seventh tooth 426 extends to the third height 406 (3), an eighth tooth 428 extends to the second height 404 (2), a ninth tooth 430 extends to the second height 404 (2), a tenth tooth 432 extends to the third height 406 (3), an eleventh tooth 434 extends to the third height 406 (3), and the twelfth tooth 436 extends to the first height 402 (1).

In some embodiments, one or more of the geometries of the teeth of the crank pulse wheel 202 is held constant to facilitate detection by the crankshaft sensor 126 and/or identification by the read module 114. For example, here the height is the differential tooth characteristic, so the width of the teeth 414-436 may be held constant and/or the size of the gap between the teeth 414-436 may be held constant. The difference between the teeth 414-436 are based on the geometric differences in the teeth rather than the size of gaps.

The read module 114 identifies a tooth type according to the tooth characteristic for teeth in a sliding buffer. The sliding buffer includes N number of teeth. N is a positive integer less than a total number of teeth of the crank pulse wheel 202. In some embodiments, the sliding buffer may include consecutive or a pattern of teeth, such as every other tooth, every third tooth, etc.

Turning to FIG. 5 is a crank tooth table 500 that includes crank tooth reference numbers corresponding to the characteristic values described with respect to FIG. 4. The crank tooth table 500 has a first sliding buffer 502. Here, the first sliding buffer 502 includes the first tooth 414 with a characteristic value (1), the second tooth 416 with a characteristic value (3), and the third tooth 418 with a characteristic value (3). Accordingly, the first sliding buffer 502 has N equal to three such that the first sliding buffer includes the characteristic value for three consecutive teeth.

The sliding buffer can be incremented by one tooth, such that the read module 114 can begin anywhere on the crank pulse wheel 202. For example, turning to FIG. 6, is a crank tooth table 600 with a second sliding buffer 602. The second sliding buffer does not begin at the fourth tooth 420, but instead includes the characteristic value of the second tooth 416. Likewise, the crank tooth table 700 of FIG. 7 illustrates a third sliding buffer 702 that begins at the third tooth 418.

Returning to FIG. 3, at block 304, a buffer value is calculated for the sliding buffer corresponding to a tooth represented in the sliding buffer. The buffer processes described below are performed by, coordinated by, and/or facilitated by the buffer module 116. The buffer module 116 may calculate the buffer value using different encoding types associated with numerical systems such as arrays, decimals, hexidecimals, binary, trinary, and transformations, among others. In some embodiments, the buffer value may be arbitrarily assigned and indexed in a crank tooth map. The buffer value may include a single parameter or multiple parameters. For example, the first sliding buffer 502 may have a first buffer value that is an array (1, 3, 3) corresponding to the characteristic values for each of the teeth in the first sliding buffer 502, as shown in FIG. 5. Alternatively, the first buffer value may use the (1, 3, 3) as the decimal value 133, the hexadecimal value 85, or the binary value 010000101. In another embodiment, the buffer value may be represented in decimal value (1, 3, 3) and the binary value (01, 11, 11) to conserve memory during operations.

At block 306, the method 300 includes determining an angular position of the crank pulse wheel 202 based on the buffer value. The positioning processes described below are performed by, coordinated by, and/or facilitated by the position module 118. The position module 118 may compare the buffer values to a listing of known angular positions. In particular, the angular position may correspond to a tooth included in the sliding buffer. For example, the first buffer value (1, 3, 3) may be compared to a crank tooth map.

FIG. 8 is a crank tooth map 800 corresponding to FIGS. 4-7. The crank tooth map is a data look up table that can be accessed by the position module 118 to determine the crankshaft position based on the buffer value of a sliding buffer. The crank tooth map may be stored locally on the VCD 102 or remotely, such as at the manufacturer database 130 and accessed over the network 128. The crank tooth map 800 includes a tooth number row 802, a sliding buffer row 804, and an angular position row. Rows 802-806 are merely exemplary and more or fewer rows with less or additional information may be included. For example, rather than an angle for the angular position, the crank tooth map 800 may include an indexed numerical value to indicate the position of the crank pulse wheel 202. Continuing the example, from above, buffer module may determine that the first sliding buffer 502 having the characteristic values (1), (3), and (3), in that order corresponds to the angular position of 330° or the third tooth 418, as shown in FIG. 8.

Because each angular position on the crank pulse wheel 202 corresponds to a specific buffer value, the buffer values do not repeat. Therefore, the read module only needs to identify the tooth characteristic for as many teeth on the crank pulse wheel 202 as are in the sliding buffer in order for the position module 118 to determine a position on the crank pulse wheel 202. For example, returning to FIG. 6, the crank tooth table 600 with a second sliding buffer 602 includes the second tooth 416 with a characteristic value (3), the third tooth 418 with a characteristic value (3), and the fourth tooth 420 with a characteristic value (2). Suppose the buffer module 116 calculates the second buffer value as (3, 3, 2) as shown in FIG. 8. The position module 118 may determine that the second buffer value (3, 3, 2) corresponds to an angular position of 0° on the crank pulse wheel 202. Because the first buffer value (1, 3, 3) is different than the second buffer value (3, 3, 2), the position module 118 can distinguish between the angular positions indicated by the first sliding buffer 502 and the second sliding buffer 602.

As another example, in FIG. 7, the crank tooth table 500 has a third sliding buffer 702 that includes the third tooth 418 with a characteristic value (3), the fourth tooth 420 with a characteristic value (2), and the fifth tooth 422 with a characteristic value (1). Suppose the buffer module 116 calculates the third buffer value as (3, 2, 1), then the position module 118 may determine that the third buffer value (3, 2, 1) corresponds to an angular position of 30° on the crank pulse wheel 202. Because the first buffer value (1, 3, 3) is different than the second buffer value (3, 3, 2), which is different than the third buffer value (3, 2, 1) the position module 118 can distinguish between the angular positions 330°, 0°, and 30° on the crank pulse wheel 202.

The VCD 102 may require a predetermined angular resolution in order to satisfy the functional requirements of the engine (not shown) of the vehicle 200. The angular resolution describes the precision and granularity with which the angular position can be determined. In the example discussed above with respect to the FIGS. 4-8, the angular resolution is 30° because each tooth corresponds to a 30° increment around the crank pulse wheel 202. However, the angular resolution can be increased or decreased based on the number of teeth on the crank pulse wheel 202, N (the number characteristic values corresponding to the number of teeth represented in the sliding buffer), and/or the number the characteristic values that the crankshaft sensor 126 is capable of distinguishing between.

Suppose that the VCD 102 has a desired angular resolution of at least 6° to provide functionality for the vehicle systems 120 that drive the engine of the vehicle 200. Because there are 360° of rotation per revolution, to achieve an angular resolution of at least 6° the crank pulse wheel needs at least 60 teeth (assuming that the sensor can only distinguish between two tooth types). Once the total number of teeth is known, the number N of teeth in the sliding buffer can be determined based on the capability of the read module 114 to distinguish between characteristic values.

Suppose, the read module 114 is capable of a base 3 determination, meaning that the read module can distinguish between 3 different types of tooth geometry, such as the low, medium, high height example shown in FIG. 4. To afford each tooth of the crank pulse wheel 202 a unique buffer value, the number of teeth of the crank pulse wheel 202 should be less than or equal to the base, b, in this example a base of 3, to the power of N, the number of teeth represented by characteristic values in the sliding buffer.

Total Number of Teeth≤$b^N$

Suppose that the base is 3 and the N is 3, the base 3 to the power of 3 is 27. Because the number of teeth on the crank pulse wheel is 60, and 60 is greater than 27, the N being 3 is inadequate to provide each tooth of the crank pulse wheel 202 a unique buffer value. Now suppose that N is 4, base 3 to the power of 4 is 81. Because the number of teeth on the crank pulse wheel, 60, and 60 is less than 81, N being 4 is adequate to provide each tooth of the crank pulse wheel 202 a unique buffer value. Therefore, the read module 114 would determine the characteristic value, from at least 3 possible characteristic values, for at least four teeth in the sliding buffer to determine the angular position of the crank pulse wheel 202 having 60 total teeth.

FIG. 9 is another crank tooth map corresponding to an example crank pulse wheel according to one or more embodiments. The crank tooth map includes a tooth table 902 and a lookup table 914. The tooth table 902 includes a characteristic value row 904, a tooth number row 906, and a buffer value row 908. The characteristic value row 904 includes the characteristic values of the teeth. For example, in a column 910, tooth 6, enumerated in the tooth number row, has a characteristic value of (1) shown in the characteristic value row 904. However, the sliding buffer 912 include more than a single characteristic value. Instead, the sliding buffer 912 includes five characteristic values (0, 0, 0, 1, 1) identified by the read module 114. The buffer module 116 determines that the five characteristic values correspond to a buffer value, 3, associated with tooth 6.

The position module 118 uses the buffer value to determine the angular position of the crank pulse wheel 202. In one embodiment, the position module 118 may use a table to determine the angular position based on calibration value. For example, the lookup table 914 includes a calibration value row 916. Additionally, a buffer value index row 918 is shown for convenience but may or may not be included in the look up table. For example, the position module 118 may use the buffer value, 3, to identify the tooth corresponding to the buffer value, here, tooth 6. The tooth number may then be used to identify the angular position. For example, here the angular position may correspond to the last tooth read in the sliding buffer as it may be where the crankshaft sensor 126 last detected the crank pulse wheel 202.

Because the crank pulse wheel 202 is turning, the sliding buffer is cyclical around the wheel. Suppose that the sliding buffer includes five characteristic values representing a tooth and the four preceding teeth. For example, tooth 1, in column 920, has a sliding buffer that includes characteristic values (0, 0, 1, 0, 0) representing tooth 29, tooth 30, and tooth 31 as well as tooth 0 and tooth 1. Accordingly, the position module 118 can determine the angular position as the crank pulse wheel 202 rotates even when the sliding buffer includes N teeth which is greater than the tooth number corresponding to the last tooth represented in the sliding buffer.

Retuning to FIG. 3, at block 308, the position module 118 broadcasts the angular position to one or more vehicle systems 120 of the vehicle 200 when the angular position has been determined. For example, the angular position may be broadcast to the fuel injection system 122. In particular, the fuel injection system 122 may deliver fuel to a combustion chamber (not shown) of the engine where the fuel is mixed with air for an intake stroke. The strokes of the engine must be precisely timed for the vehicle 200 to function correctly. Accordingly, the fuel injection system 122 may receive the angular position to synchronize the functioning of one or more off the vehicle systems 120. The angular position may also be requested by one or more vehicle systems 120 and transmitted in response to the request.

The position module 118 may broadcast the angular position of the crank pulse wheel 202 using and an input/output (I/O) interface 110, the bus 112, the network 128 and/or other wired and wireless technologies. For example, the position module may transmit the angular position to the manufacturer database via the network 128 for troubleshooting, indexing, or experimental reasons. In another embodiment, the position module 118 may store the angular position in a memory 106 such that the angular position is accessible to other components.

Figure 10:
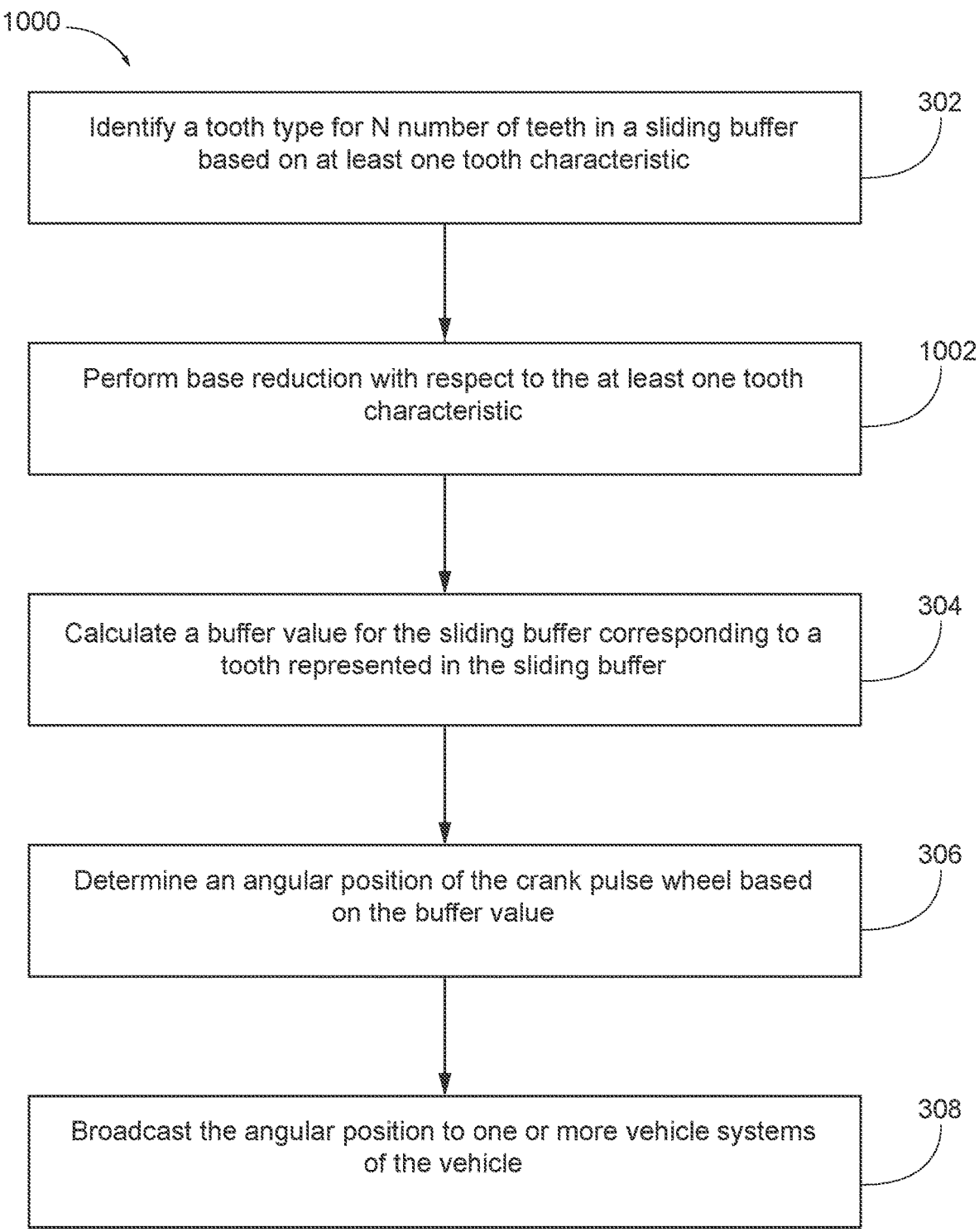
FIG. 10 is an example flow diagram of a method for crankshaft tooth encoding including base reduction according to one or more embodiments.

FIG. 10 is an example flow diagram of a method 1000 for crankshaft tooth encoding including base reduction according to one or more embodiments. FIG. 10 recites similar steps as FIG. 3 which operate in a similar manner as described above. FIG. 10 will be described with reference to FIGS. 1-4. As shown in FIG. 10, the method for providing a crankshaft tooth encoding is described according to a number steps for simplicity, but it is understood that the elements of the method 1000 can be organized into different architectures, blocks, stages, and/or processes.

At block 302, a tooth type for N number of teeth of the crank pulse wheel 202 are identified based on at least one tooth characteristic as described above. At block 1002, the read module 114 performs a base reduction with respect to at least one tooth characteristic. The base reduction modifies the characteristic values of one or more teeth to facilitate differentiation between teeth 414-436 of the crank pulse wheel 202.

Figure 11:
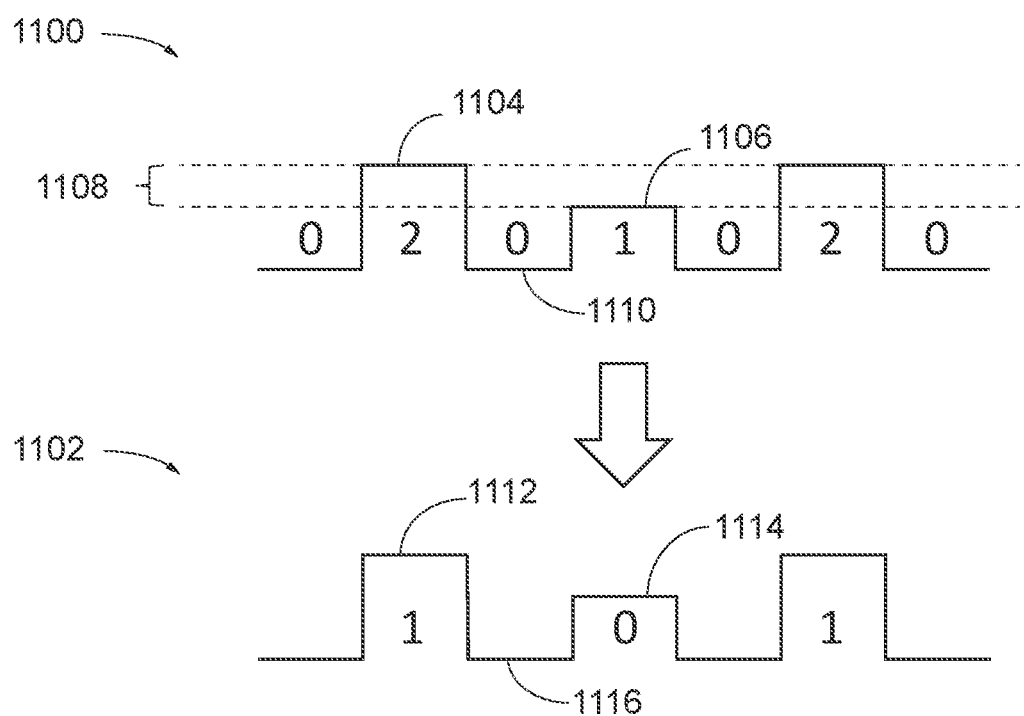
FIG. 11 is a schematic diagram of a crankshaft tooth geometry using base reduction according to one or more embodiments.

Turning to FIG. 11 is a schematic diagram of a crankshaft tooth geometry using base reduction is shown. FIG. 11 includes a first tooth pattern 1100 that is modified according to a base reduction to generate the second tooth pattern 1102. The first tooth pattern 1100 and the second tooth pattern 1102 illustrate the same tooth pattern. For example, the first tooth pattern includes a number of teeth separated by gaps.

The read module 114 is identifying tooth type for N number of teeth of the crank pulse wheel 202 based on at least one tooth characteristic. Therefore, the read module 114 may not use the gap information. Accordingly, rather than attributing characteristic values, such as 0, to the gaps, the read module 114 may perform a base reduction to discard information about the gaps, thereby allowing a characteristic value assigned to the gaps to be attributed to a tooth characteristic.

Suppose that the first tooth 1104 of the first tooth pattern 1100 has a height differential with the second tooth 1106 of the first tooth pattern 1100. For example, the first tooth 1104 may have a height that is greater than the second tooth 1106 by a height differential 1108. The teeth are separated by gaps such as gap 1110 that acts as a baseline. Accordingly, when determining the characteristic values of the tooth characteristics of the gap may be assessed as (0) such that the read module 114 applies a characteristic value of (1) to the second tooth 1106 and a characteristic value of (2) to the first tooth 1104 due to the higher height of the first tooth 1104 as compared to the second tooth 1106. However, the gap information is disregarded and the characteristic values are determined based on the relative tooth characteristics, such as the relative height, of the teeth.

Therefore, the read module 114 may perform a base reduction to disregard the gap information. Here the zeroes applied to the gaps. The base reduction can then reduce the characteristic values for the teeth. For example, the first base reduced tooth 1112 of the second tooth pattern 1102 has a height differential with the second base reduced tooth 1114 of the second tooth pattern 1102. For example, first base reduced tooth 1112 may have a height that is greater than the second base reduced tooth 1114 by a height differential 1108. The teeth are separated by gaps such as gap 1116 that acts as a baseline. However, here, the due to base reduction, characteristic values are not applied to the gaps.

Accordingly, when determining the characteristic values of the tooth characteristics, the read module 114 applies a characteristic value of (0) to the second base reduced tooth 1114 and a characteristic value of (1) to the first base reduced tooth 1112 due to the higher height of the first base reduced tooth 1112 as compared to the second base reduced tooth 1114. Therefore, rather than using three characteristic values (0), (1), and (2) used with the first tooth pattern 1100, the second tooth pattern 1102 requires less characteristic values (0) and (1) to encode the teeth. Base reduction reduces the processing resources, including time, necessary to read and utilize the characteristic values. Given the example from above, the buffer module 116 does not need to use trinary processes to generate the buffer value from the characteristic values, but instead could use binary encoding.

Figure 12:
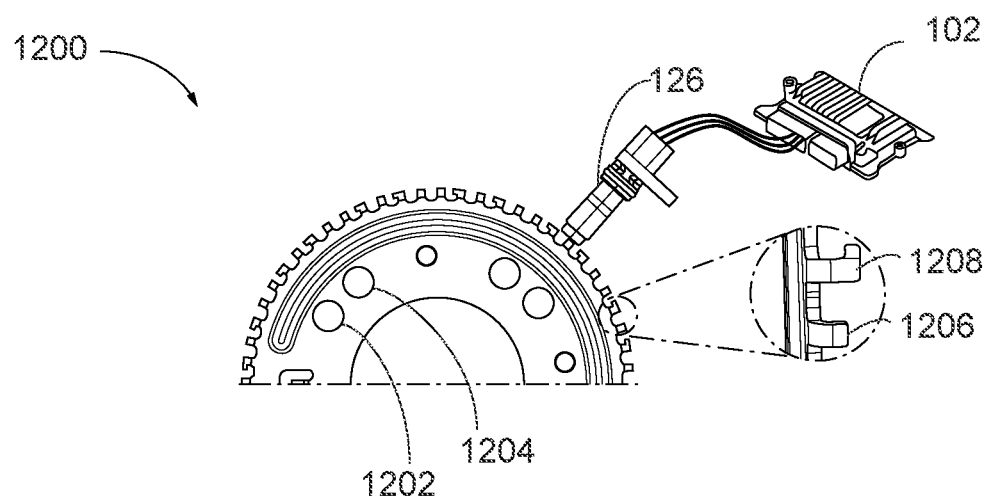
FIG. 12 is a schematic diagram of an alternative crankshaft tooth geometry of a crank pulse wheel according to one or more embodiments.

FIG. 12 is a schematic diagram of an alternative crankshaft tooth geometry of a crank pulse wheel according to one or more embodiments. The crank pulse wheel 1200 has a number of teeth being sensed by the crankshaft sensor 126, which are then received at the VCD 102. Here the crank pulse wheel 1200 may include a number of holes, such as a first hole 1202 and a second hole 1204. The holes 1202 and 1204 may change the manner in which the crankshaft sensor 126 senses the teeth. For example, the crankshaft sensor 126 may include a depth sensor that can determine the depth of the tooth gear at a position corresponding to a tooth such that teeth can additionally be differentiated by relative depth. Alternatively, the holes 1202 and 1204 may be sensed separately from the teeth and those sensed values may be applied to the characteristic values of the teeth. For example, the holes may be sensed by a separate sensor (not shown) from the crankshaft sensor 126.

In addition to the geometric features of the crank pulse wheel 1200, the teeth may have geometric features that change the shape of the individual teeth. For example, a first tooth 1206 has a profile that is vertically linear with respect to the radius of the crank pulse wheel 1200, while the second tooth 1208 has a protrusion in that causes the profile of the second tooth 1208 to include at least one angle. In particular, the profile of the protrusion of the second tooth 1208 is cantilevered with respect to the main body of the second tooth 1208. The crankshaft sensor 126 may detect both the profile of the teeth and the physical features of the crank pulse wheel 202. For example, the crankshaft sensor 126 may include a plurality of sensors, such as an optical sensor and a Hall Effect sensor.

Figure 13:
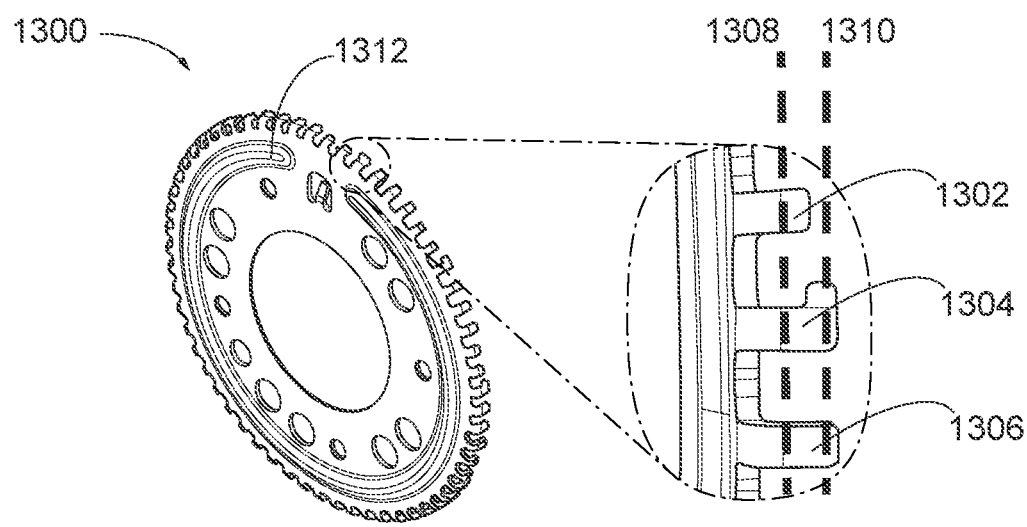
FIG. 13 is a schematic diagram of a crankshaft pulse wheel having a guide according to one or more embodiments.

Turning to FIG. 13, the crank pulse wheel 1300 includes a first tooth 1302, a second tooth 1304, and a third tooth 1306. The teeth 1302-1306 have different have different widths that are variable with respect to the height of the teeth 1302-1306. For example, the first tooth 1302 may be a low tooth, the second tooth 1304 may be a protrusion tooth, and the third tooth 1306 may be a high tooth. Suppose the first axis 1308 is a low axis separated from the second axis 1310 by a height differential. The first tooth 1302 may only intersect the first axis 1308 because of the low height of the first tooth 1302. The second tooth 1304 may have a first width at the first axis 1308 but a different, here longer, width at the second axis 1310. The third tooth may have the same width at both the first axis 1308 and the second axis 1310. Accordingly, the crankshaft sensor 126 may differentiate between the teeth based on multiple tooth characteristics, and the multiple characteristics may be based on the comparative geometric features relative to the crank pulse wheel 1300.

Furthermore, the crank pulse wheel 1300 also has a guide 1312. Like the holes 1202 and 1204 of the crank pulse wheel 1200, the guide 1312 of the crank pulse wheel 1300 is a feature of the crank pulse wheel 1300 to facilitate differentiation between the teeth of the crank pulse wheel 1300. For example, the guide 1312 may change the width of the main body of the crank pulse wheel 1300 with respect to one or more teeth. Because the teeth on the crank pulse wheel 1300 are differentiable, the teeth can be ordered to encode angular positions into the pattern of teeth. Therefore, when the buffer module 116 can calculate a buffer value based on the tooth characteristics identified in a sliding buffer identified by the read module 114. Because each sliding buffer has a unique buffer value corresponding to an angular position, the position module 118 can determine the angular position based on a reading of only as many teeth as are in the sliding buffer. Therefore, the angular position can be determined after a fixed rotational amount without prior knowledge of the position of the crank pulse wheel 1300 or without reading and indexing each of the teeth on the crank pulse wheel 1300.

Figure 14:
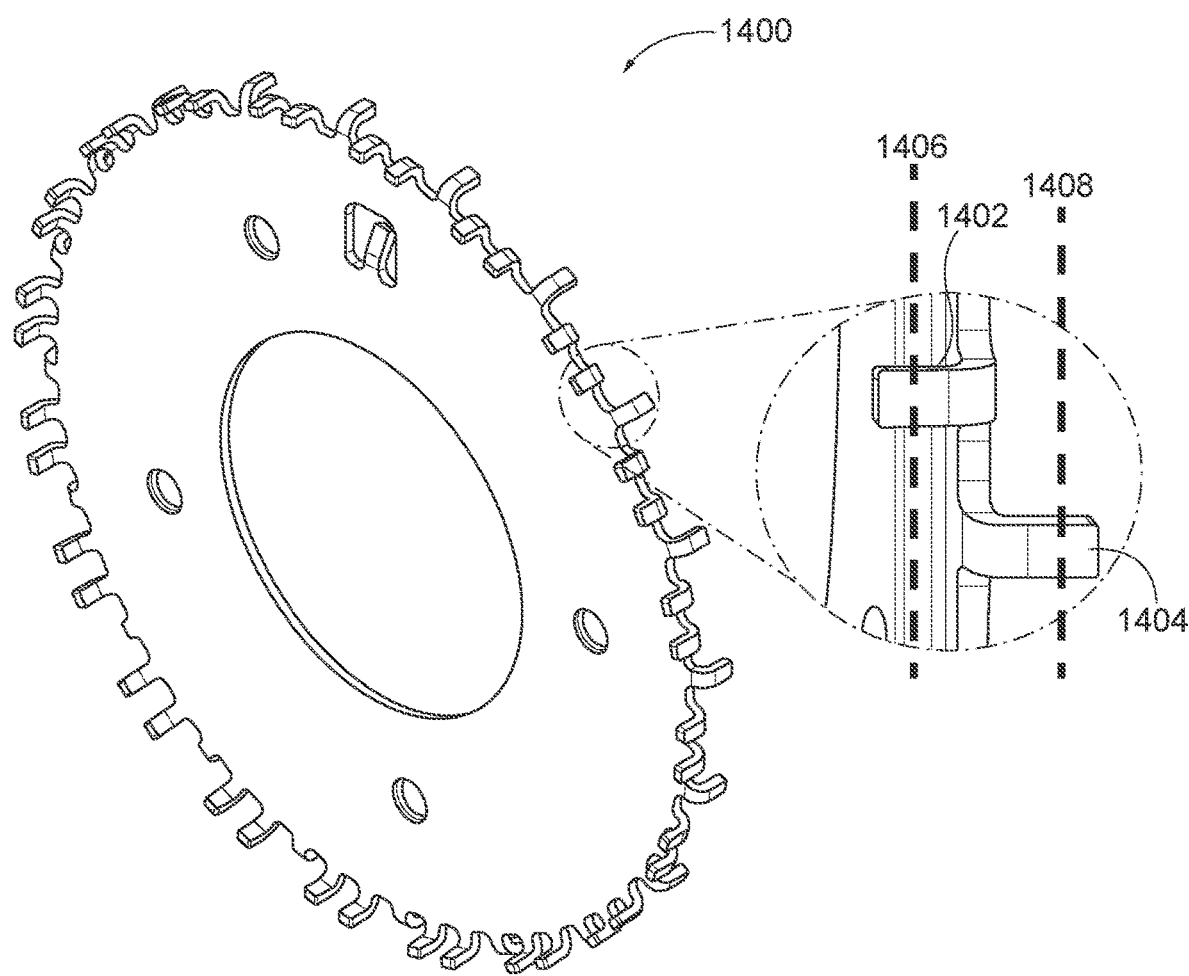
FIG. 14 is a schematic diagram of a crankshaft pulse wheel having multiple sensory axes according to one or more embodiments.

FIG. 14 is a schematic diagram of a crankshaft pulse wheel having multiple sensory axes according to one or more embodiments. The crank pulse wheel 1400 includes a first tooth 1402 and a second tooth 1404. The first tooth 1402 and the second tooth 1404 have protrusions that extend over a first axis 1406 or a second axis 1408. For example, the first tooth 1402 has a protrusion that meets or extends over the first axis 1406. Likewise, the second tooth 1404 has a protrusion that meets or extends over the second axis 1408. Accordingly, the teeth are differentiable based on the direction of the protrusion of the teeth.

The teeth may additionally be differentiable based on the height of the teeth. For example, the protrusions may extend from the tooth at varying heights (e.g., low, medium, high), extend at different angles, the protrusions may have different lengths or shapes, etc. Therefore, as discussed above, the crankshaft sensor 126 may differentiate between the teeth based on multiple tooth characteristics, and the multiple characteristics may be based on the comparative geometric features relative to the crank pulse wheel 1400.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various embodiments of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for crankshaft tooth encoding for a crank pulse wheel of a vehicle, the system comprising:
   a read module configured to identify a tooth type for N number of teeth in a sliding buffer based on at least one tooth characteristic, wherein N is a positive integer less than a total number of teeth of the crank pulse wheel;
   a buffer module configured to calculate a buffer value for the sliding buffer corresponding to a collection of teeth represented in the sliding buffer, wherein each tooth of the total number of teeth is associated with a corresponding buffer value, and wherein buffer values are unique; and
   a position module configured to determine an angular position of the crank pulse wheel based on the buffer value and broadcast the angular position to one or more vehicle systems of the vehicle.

2. The system for crankshaft tooth encoding of claim 1, wherein the N number of teeth in the sliding buffer is based on an encoding type of the read module.

3. The system for crankshaft tooth encoding of claim 2, wherein the encoding type represents the at least one tooth characteristic as one of a number of characteristic values.

4. The system for crankshaft tooth encoding of claim 3, wherein the number of characteristic values to the power of the N number of teeth in the sliding buffer is greater than or equal to the total number of teeth of the crank pulse wheel.

5. The system for crankshaft tooth encoding of claim 2, wherein the encoding type of the read module is binary.

6. The system for crankshaft tooth encoding of claim 1, wherein the read module is further configured to set the N number of teeth in the sliding buffer based on a desired angular resolution of the one or more vehicle systems.

7. The system for crankshaft tooth encoding of claim 6, wherein the desired angular resolution is based on the total number of teeth of the crank pulse wheel.

8. The system for crankshaft tooth encoding of claim 1, wherein the at least one characteristic is a height of the N number of teeth.

9. The system for crankshaft tooth encoding of claim 1, wherein the one or more vehicle systems include a fuel injection system of the vehicle.

10. A method for crankshaft tooth encoding for a crank pulse wheel of a vehicle, the method comprising:
   identifying a tooth type for N number of teeth in a sliding buffer based on at least one tooth characteristic, wherein N is a positive integer less than a total number of teeth of the crank pulse wheel;
   calculating a buffer value for the sliding buffer corresponding to a collection of teeth represented in the sliding buffer, wherein each tooth of the total number of teeth is associated with a corresponding buffer value, and wherein buffer values are unique;
   determining an angular position of the crank pulse wheel based on the buffer value; and
   broadcasting the angular position to one or more vehicle systems of the vehicle.

11. The method for crankshaft tooth encoding of claim 10, wherein buffer values are associated with corresponding angular positions.

12. The method for crankshaft tooth encoding of claim 11, wherein the buffer values and corresponding angular positions are stored in a lookup table.

13. A non-transitory computer-readable storage medium storing instructions that, when executed by a computer, causes the computer to perform a method for crankshaft tooth encoding comprising:
   identifying a tooth type for N number of teeth in a sliding buffer based on at least one tooth characteristic, wherein N is a positive integer less than a total number of teeth of a crank pulse wheel of a vehicle;
   calculating a buffer value for the sliding buffer corresponding to a collection of teeth represented in the sliding buffer, wherein each tooth of the total number of teeth is associated with a corresponding buffer value, and wherein buffer values are unique;
   determining an angular position of the crank pulse wheel based on the buffer value; and
   broadcasting the angular position to one or more vehicle systems of the vehicle.

14. The non-transitory computer-readable storage medium of claim 13, wherein the N number of teeth in the sliding buffer is based on an encoding type.

15. The non-transitory computer-readable storage medium of claim 14, wherein the encoding type represents the at least one tooth characteristic as one of a number of characteristic values.

16. The non-transitory computer-readable storage medium of claim 15, wherein the number of characteristic values to the power of the N number of teeth in the sliding buffer is greater than or equal to the total number of teeth of the crank pulse wheel.

17. The non-transitory computer-readable storage medium of claim 13, wherein the N number of teeth in the sliding buffer is set based on a desired angular resolution of the one or more vehicle systems.

* * * * *